(12) United States Patent
Uematsu et al.

(10) Patent No.: US 7,168,242 B2
(45) Date of Patent: Jan. 30, 2007

(54) NOX CATALYST REGENERATION METHOD FOR NOX PURIFYING SYSTEM AND NOX PURIFYING SYSTEM

(75) Inventors: Yutaka Uematsu, Zama (JP); Jin Yokoyama, Hino (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 10/774,490

(22) Filed: Feb. 10, 2004

(65) Prior Publication Data

US 2004/0159097 A1 Aug. 19, 2004

(30) Foreign Application Priority Data

Feb. 19, 2003 (JP) .............................. 2003-041478

(51) Int. Cl.
*F01N 3/00* (2006.01)

(52) U.S. Cl. ............................ 60/295; 60/274; 60/277; 60/286; 60/301

(58) Field of Classification Search .................. 60/274, 60/276, 277, 285, 286, 295, 301
See application file for complete search history.

(56) References Cited

U.S. PATENT DOCUMENTS

| 5,526,643 | A | * | 6/1996 | Mukaihira et al. ............ 60/276 |
| 5,778,666 | A | * | 7/1998 | Cullen et al. ................. 60/274 |
| 6,032,461 | A | * | 3/2000 | Kinugasa et al. ............. 60/295 |
| 6,343,466 | B1 | * | 2/2002 | Mukaihira et al. ............ 60/277 |
| 6,427,439 | B1 | * | 8/2002 | Xu et al. ...................... 60/286 |
| 6,499,291 | B2 | * | 12/2002 | Lang et al. .................... 60/277 |
| 6,644,021 | B2 | * | 11/2003 | Okada et al. ................. 60/286 |

FOREIGN PATENT DOCUMENTS

JP 7-102954 4/1995

* cited by examiner

*Primary Examiner*—Binh Q. Tran
(74) *Attorney, Agent, or Firm*—Staas & Halsey LLP

(57) ABSTRACT

This is a method for regenerating the NOx catalyst in a NOx purifying system provided in the exhaust passage with a direct reduction type NOx catalyst which directly decomposes the NOx during lean-condition operation and is regenerated at rich-condition operation, and the method prohibiting the rich-condition control when the temperature detected by a catalyst temperature detecting means is within the predetermined temperature range.

Thus, when the exhaust gas are temporarily made rich-condition for catalyst regeneration which means recovering the NOx purifying ability of the direct reduction type NOx catalyst arranged in the exhaust passage of the engine, the NOx is prohibited from being discharged into the atmospheric air, and also the purifying ability can surely be recovered.

4 Claims, 4 Drawing Sheets

NOX CATALYST REGENERATION METHOD FOR NOX PURIFYING SYSTEM AND NOX PURIFYING SYSTEM

BACKGROUND OF THE INVENTION

This invention relates to a method for regenerating the NOx catalyst in a NOx purifying system in which NOx (nitrogen oxides) in the exhaust gas of an internal combustion engine is purified by using a direct reduction type NOx catalyst, and to a NOx purifying system.

Various research efforts and proposals have been made concerning a catalyst-type exhaust gas purifying system for purifying the exhaust gas of an internal combustion engine of an automobile, a stationary type internal combustion engine or the like by reducing NOx. Especially, in order to purify the exhaust gas of automobiles or the like, a NOx occlusion reduction type catalyst, a three-way catalyst or the like have been used.

A regenerating operation is performed in the exhaust gas purifying system of an internal combustion engine provided with this NOx occlusion reduction type catalyst in its exhaust passage. This regenerating operation causes the NOx occlusion reduction type catalyst to occlude NOx when an air/fuel ratio of the exhaust gas flowing is lean. Moreover, when the NOx absorption capacity is almost saturated, the regeneration operation brings the air/fuel ratio of exhaust gas into the theoretical air/fuel ratio or rich state by reducing the oxygen concentration of the influent exhaust gas. Thus, the regenerating operation restores the NOx absorption capacity by discharging the occluded NOx, and also makes the discharged NOx reduce by a noble metal catalyst attached to the NOx purifying system.

This NOx occlusion reduction type catalyst is constituted with a noble metal catalyst such as platinum (Pt) and a NOx absorbent of an alkaline earth such as barium (Ba) on the catalyst support. Then, in the high oxygen concentration atmosphere, NO in the exhaust gas is oxidized into $NO_2$ by the catalytic action of platinum, and this $NO_2$ is diffused in the catalyst in a form of $NO_3^-$ and absorbed in a form of nitrate.

Next, when the air/fuel ratio becomes rich and the oxygen concentration is reduced, the $NO_3^-$ is discharged in a form of $NO_2$. This discharged $NO_2$ is reduced into $N_2$ through a reducing agent such as unburned HC, CO or $H_2$ contained in the exhaust gas by the catalytic action of platinum. This reducing action can prevent NOx from being discharged into the atmosphere.

This NOx occlusion reduction type catalyst entails a problem inasmuch as the absorbable NOx amount varies widely according to the temperature of the NOx absorbent, therefore, for example, the exhaust gas purifying system according to the Japanese Patent Laid-Open No. 102954/1995 is devised so as to be set to an optimal NOx absorption time by varying the NOx absorption time according to the exhaust gas temperatures.

On the other hand, separately from this NOx occlusion reduction type catalyst, there is a catalyst which directly reduces NOx (referred to hereafter as "direct reduction type NOx catalyst"). This direct reduction type NOx catalyst is the one provided with a metal such as rhodium (Rh), palladium (Pd), or the like as a catalyst component to be borne on a support such as β-zeolite. Moreover, cerium (Ce) is blended with the catalyst which contributes to maintaining the NOx reducing potential and to reduce the oxidation action of the metal, or a three-way catalyst is arranged in a lower layer in order to accelerate the oxidation-reduction reaction or especially the reducing reaction of NOx in a rich state, or iron (Fe) is added to the support in order to improve a purifying rate of NOx.

This direct reduction type NOx catalyst has the advantage of becoming less contaminated with sulfur poisoning. In a high oxygen concentration atmosphere, for example the exhaust gas of an internal combustion engine such as a diesel engine of which the air/fuel ratio is in a lean state, the NOx is directly reduced into $N_2$. However, since $O_2$ is adsorbed on the metal which is the active substance of the catalyst in the case of this reduction, the reducing ability is lowered.

For this reason, it is necessary to regenerate and activate the active substance of the catalyst by lowering the oxygen concentration in the exhaust gas almost to zero percent so that the air/fuel ratio of the exhaust gas becomes the theoretical air/fuel ratio or rich state. Still, this regeneration of the catalyst is speedily performed even at low temperatures (for example, 200° C. or higher) compared with the temperatures for other catalysts.

Therefore, in order to allow this direct reduction type NOx catalyst to demonstrate fully its NOx purifying performance in the NOx purifying system arranged in the exhaust passage of the engine, it is necessary to perform lean-condition control for normal driving and rich-condition control for catalyst regeneration by properly switching between them during engine operation.

However, even if rich-condition control is carried out, this direct reduction type NOx catalyst brings the following problem when the catalyst is in the high temperature range. Namely, if rich-condition control is performed for catalyst regeneration, the amount of NOx exhausted to the atmospheric air is in fact increased. Moreover, since the catalyst cannot be regenerated, the purifying performance is not recovered while at the same time fuel costs are increased.

Namely, unlike the NOx occlusion reduction type catalyst, this direct reduction type NOx catalyst does not occlude NOx by chemical combining. However, the catalyst exhibits a physical adsorption phenomenon of NOx. The relationship between this NOx adsorption quantity and the catalyst temperatures is shown in FIG. 3. Therefore, even under the rich condition, the NOx adsorption quantity is decreased due to the rising in the catalyst temperature when the catalyst temperature comes in the high temperature range. And, the portion of the NOx decreased in adsorption is exhausted. Thus, it is presumed that the NOx is increased in the exhaust quantity.

In FIG. 4, the NOx concentration at the outlet of the catalyst is shown when the engine is operated under a rich condition of the air/fuel ratio and the exhaust gas is raised in temperature at the catalyst outlet with time. According to this FIG. 4, even if a certain quantity of NOx is supplied to the NOx catalyst, the quantity of NOx at the catalyst outlet varies correspondingly to the rising in the exhaust gas temperature at the catalyst outlet. As the exhaust gas temperature rises at the catalyst outlet, the quantity of NOx more than that of NOx influent to the direct reduction type NOx catalyst from the inlet is discharged from the catalyst outlet. Especially, the discharge is remarkably increased at 420° C. or higher.

BRIEF SUMMARY OF THE INVENTION

The present invention has been made for solving the above-mentioned problems, and the purpose thereof is to provide a method for regenerating a NOx catalyst of a NOx purifying system and the NOx purifying system, capable of prohibiting NOx from being exhausted into the atmospheric air and surely recovering the purifying ability by judging whether or not the engine is to be shifted to the rich-condition control operation according to the temperature detected by the catalyst temperature detecting means when making the exhaust gas temporarily rich-condition for catalyst regeneration to recover the NOx purifying ability of the direct reduction type NOx catalyst arranged in the exhaust gas passage of the engine, and shifting the engine to the rich-condition control operation only when the temperature detected by the catalyst temperature detecting means is within a certain temperature range.

The method for regenerating the NOx catalyst of the NOx purifying system for achieving the above-mentioned purpose is the one in the NOx purifying system provided in the exhaust gas passage with the direct reduction type NOx catalyst which directly decomposes the NOx during lean-condition operation and is regenerated during rich-condition operation, and is constituted to be characterized in prohibiting the rich-condition control when the temperature detected by the catalyst temperature detecting means is within a predetermined temperature range.

Then, the NOx purifying system for embodying the above-mentioned NOx catalyst regeneration method for the NOx purifying system is constituted so that the NOx purifying system provided in the exhaust gas passage with the direct reduction type NOx catalyst, which directly decomposes the NOx in the exhaust gas during lean-condition operation and is regenerated during rich-condition operation, is provided with a catalyst temperature detecting means, and a control device for controlling to prohibit the rich-condition control when the temperature detected by the catalyst temperature detecting means is within a specified temperature range.

This direct reduction type NOx catalyst can be composed by making the special metals such as rhodium (Rh) and palladium (Pd) as the catalyst components to be supported on a support such as β-zeolite. Moreover, the rich-condition control for catalyst regeneration can be performed by intake-air control such as an intake throttle, fuel injection control such as post-injection, EGR control or the like. This predetermined temperature range can be determined by experiments or the like, and is a temperature range which can be obtained from preset numerical values, map data or the like. It is a temperature range higher than a predetermined judgment value which is, for example, a temperature within the range of 400° C.–500° C.

Concerning the methods for measuring the catalyst temperature by the catalyst temperature detecting method and the exhaust gas temperature, as shown in FIG. 2, a method of measuring the temperatures by arranging temperature sensors in the catalyst and the exhaust gas passage, a method of calculating them from engine speed and accelerator opening by referring to the catalyst temperature map and the exhaust gas temperature map preset by calibration, or the like are considered.

And, by the NOx catalyst regeneration method of this NOx purifying system and the NOx purifying system, the rich-condition control can be performed avoiding the temperature range of the catalyst in which the NOx concentration is increased at the catalyst outlet during the rich-condition control. Therefore, it is possible to efficiently purify the NOx in the exhaust gas while preventing the NOx from being discharged into the atmospheric air. Moreover, since the direct reduction type NOx catalyst can surely be regenerated under the rich-condition control, the fuel cost can be prevented from worsening.

DETAILED DESCRIPTION OF THE INVENTION

Figure 1:
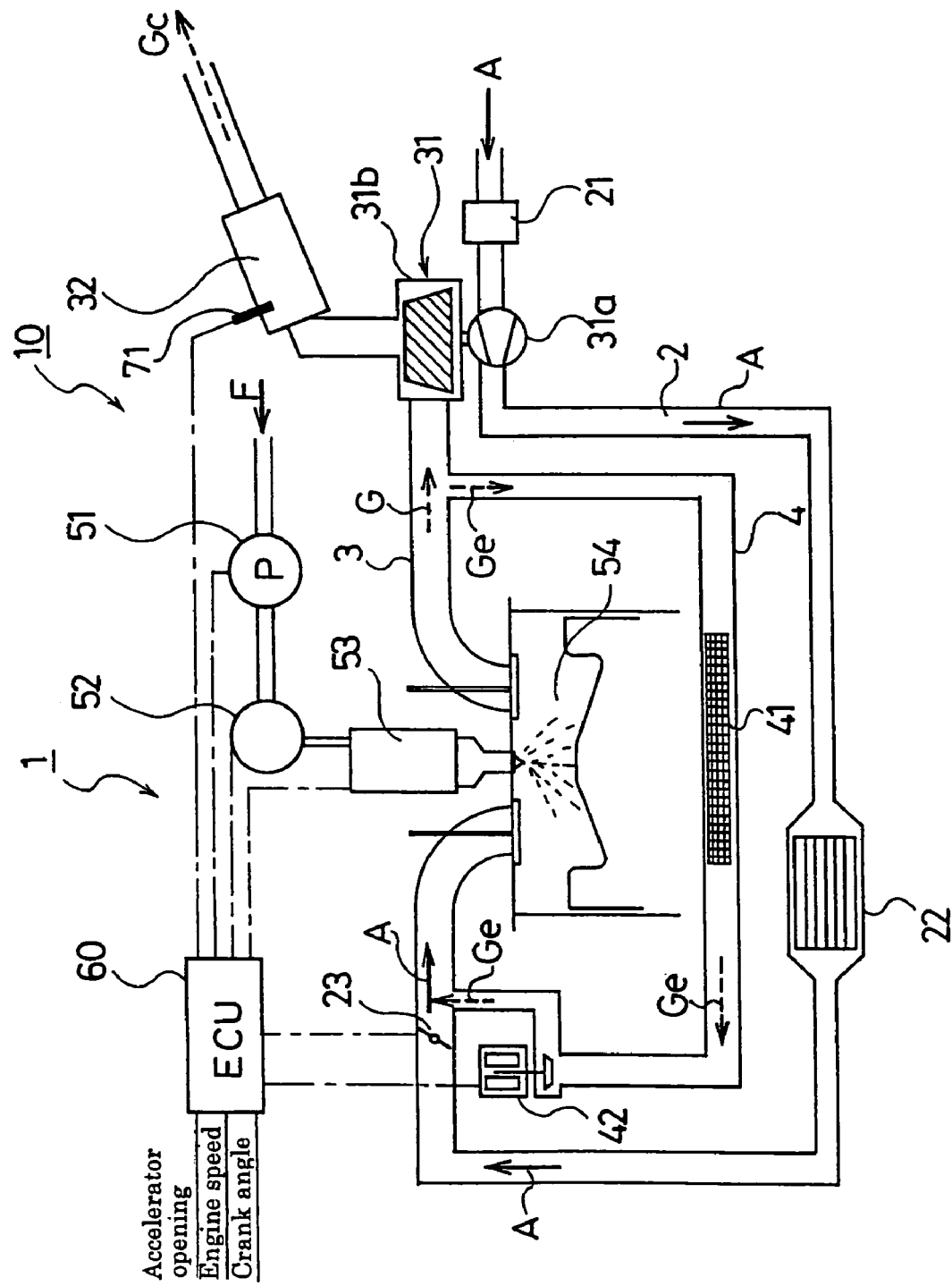
FIG. 1 shows an engine system provided with an exhaust gas purifying system having the direct reduction type NOx catalyst in the embodiment according to the present invention.

The method for regenerating the NOx catalyst in the NOx purifying system and the NOx purifying system relating to the present invention will be explained below referring to the drawings.

As shown in FIG. 1, this NOx purifying system 10 is provided with an intake air quantity sensor (air-mass flow sensor) 21, a compressor 31a of a turbo-charger 31, an inter-cooler 22, and an intake throttle (intake throttle valve) 23. Moreover, a turbine 31b of the turbo-charger 31, is arranged in the exhaust pipe 3 of the engine 1. And a direct reduction type NOx catalyst 32 is arranged in the exhaust gas passage (exhaust pipe) 3. Moreover, an EGR cooler 41 and an EGR valve 42 are arranged in an EGR passage (EGR pipe: exhaust gas recirculation passage) 4.

Further, a temperature sensor 71 which serves as a catalyst temperature detecting means for detecting the catalyst temperatures, is arranged in the direct reduction type NOx catalyst 32. However, in the case of using the exhaust gas temperature instead of the catalyst temperature, the temperature sensor 71 may be arranged in the neighborhood of the inlet or outlet of the direct reduction type NOx catalyst 32.

Moreover, the fuel injection system is provided with a fuel pump 51 for feeding fuel F to the combustion chamber 54 of the engine from a fuel tank (not illustrated), a common rail 52, and a fuel injection valve (injector) 53. Further, a control device 60 called an ECU (engine control unit) is provided for controlling the engine 1. Accelerator opening Acc, engine speed Ne, crank angle CA, etc are inputted to the control device 60.

And, the direct reduction type NOx catalyst 32 is composed by making special metals (active substances) such as rhodium (Rh) and palladium (Pd) to be supported on a support such as β-zeolite. Further, cerium (Ce) is blended which contributes to maintaining the NOx reducing potential and to reduce the oxidation action of the metal, or a three-way catalyst is arranged in a lower layer in order to accelerate the oxidation-reduction reaction, especially, the reducing reaction of NOx in a rich state, or iron (Fe) is added to the support in order to improve a purifying rate of NOx.

This direct reduction type NOx catalyst 32 directly reduces the NOx into $N_2$ by contacting with the NOx in a high oxygen concentration atmosphere as in the exhaust gas of the internal combustion engine such as a diesel engine where an air/fuel ratio is in the lean state. At the same time, $O_2$ is adsorbed on the active substance of the catalyst and the reducing ability is lowered. This reducing ability can be regenerated in the reduction atmosphere in which the oxygen concentration of the exhaust gas is almost zero percent as same as when the air/fuel ratio is the theoretical air/fuel ratio or rich.

Figure 2:
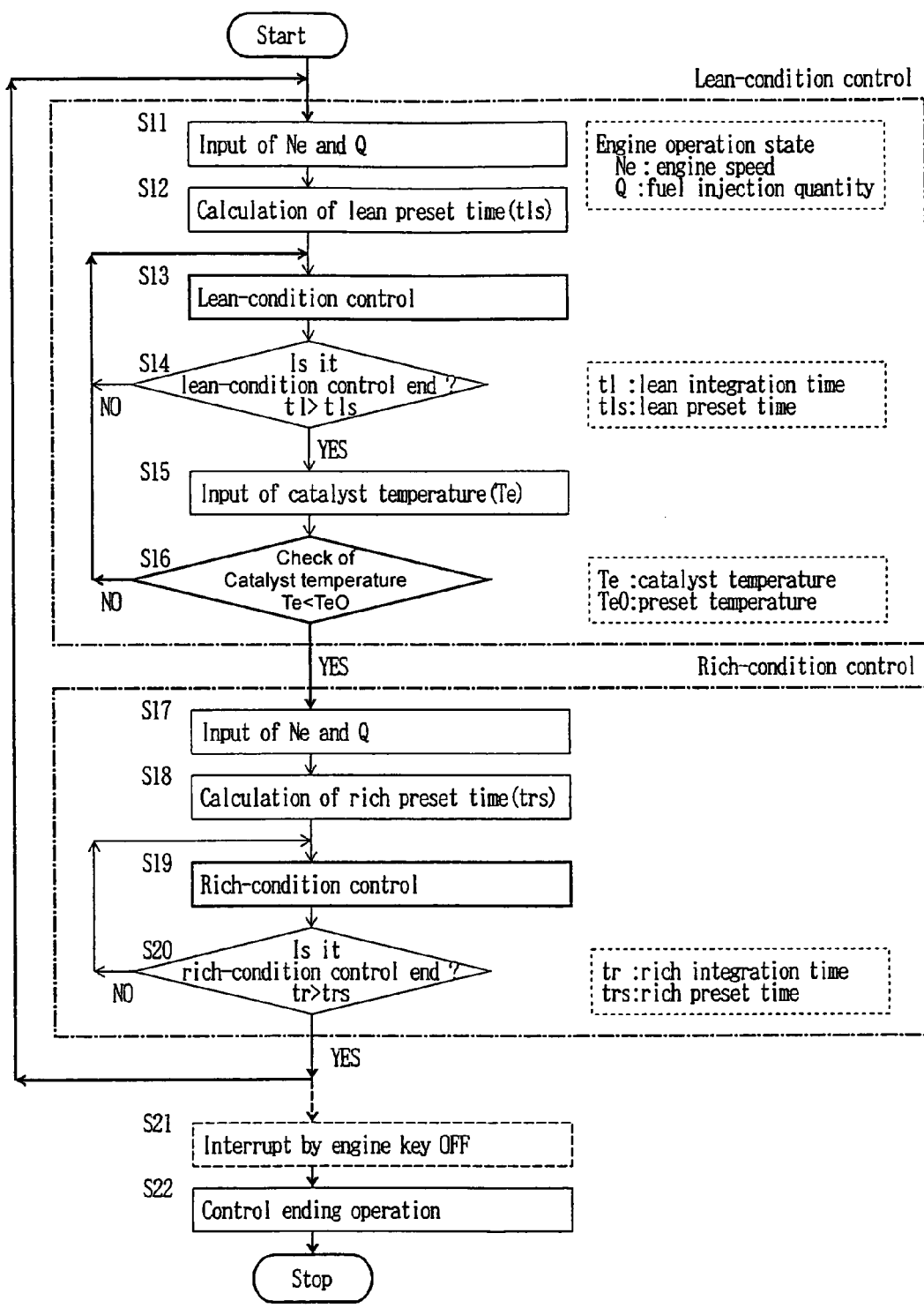
FIG. 2 shows the control flow of the embodiment according to the present invention.

And, the catalyst regeneration of the NOx purifying system is performed according to the control flow as shown in FIG. 2. This control flow is the one to be performed in parallel with the engine control flow. Then, this control flow is started when the engine operation is started, and is stopped at the same time as the engine operation is stopped, namely, at the same time as the interruption by switching off the engine key.

And, when this control flow is started, it enters the lean-condition control flow. At step S11, engine speed Ne and fuel injection quantity Q are inputted. At the next step S12, a lean preset time tls is calculated from the engine speed Ne and the fuel injection quantity Q referring to the lean setting time map.

At the next step S13, the lean-condition control is performed for a predetermined time (a time related to the time interval of the control). Thereafter, the flow goes to the judgment for ending the lean-condition control at the step S14.

At this step S13, the NOx in the exhaust gas is brought into contact with the active substance of the direct reduction type NOx catalyst 32 and is reduced into $N_2$. However, since $O_2$ is adsorbed on the active substance at this reduction, the reducing ability is gradually lowered.

And, if it is judged by the judgment for ending the lean-condition control at the step S14 that the lean integration time tl does not exceed the lean preset time tls and the lean-condition control is not completed, the control flow returns to the step S13 to repeat the lean-condition control. Moreover, if it is judged that the lean integration time tl exceeds the lean preset time tls and the lean-condition control is completed, the control flow goes to the step S15.

Figure 3:
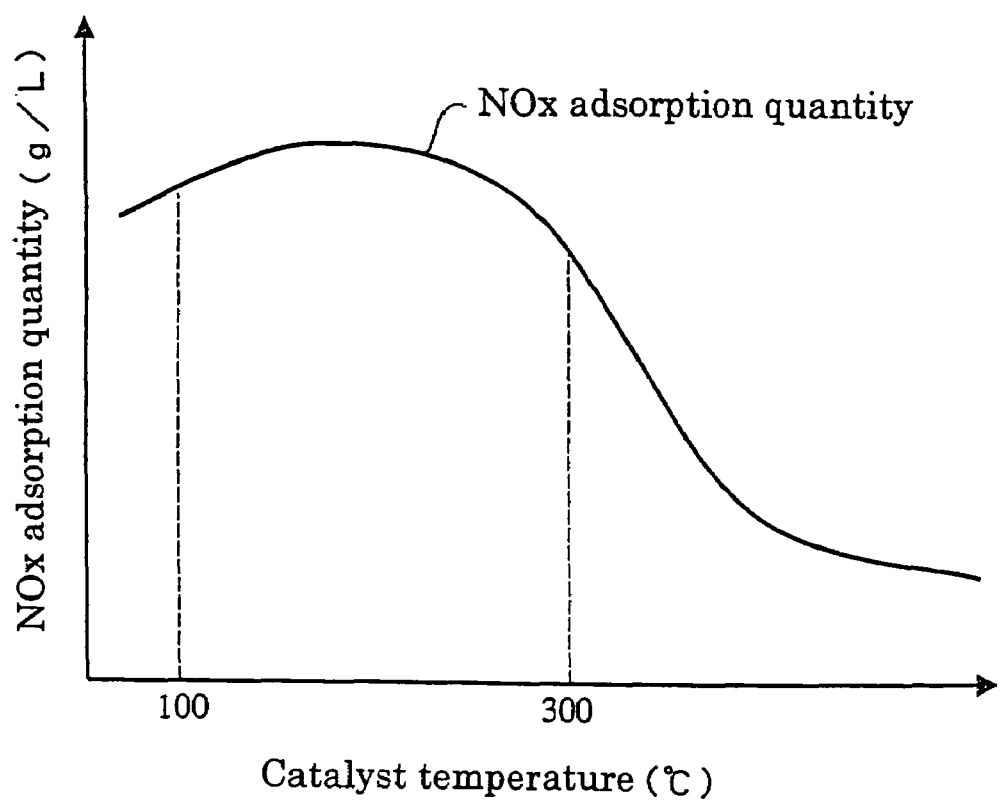
FIG. 3 shows the characteristic of the direct reduction type NOx catalyst when rich-condition is maintained.
Figure 4:
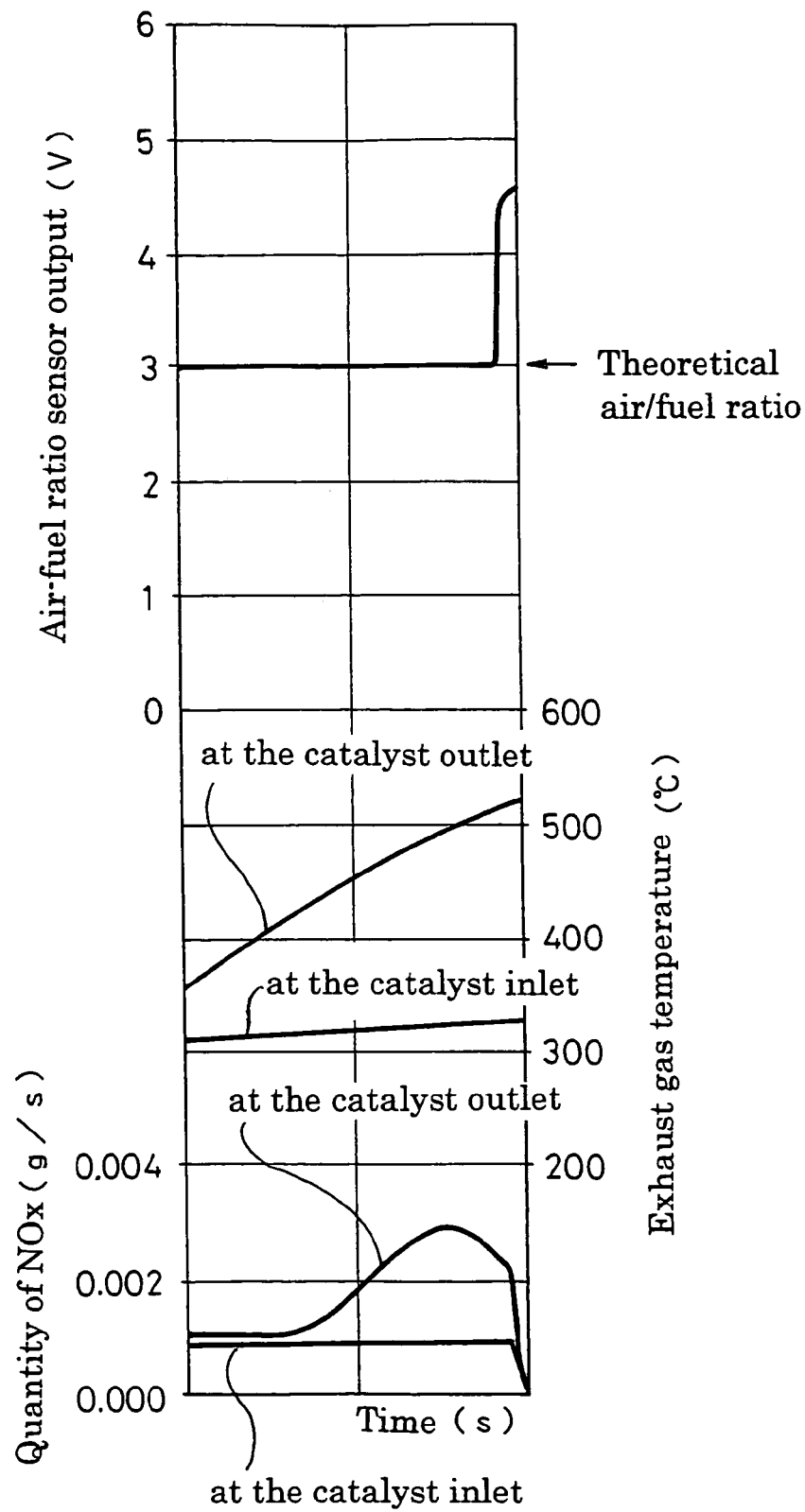
FIG. 4 shows the relationship between the exhaust gas temperature and the quantity of NOx adsorption about the direct reduction type NOx catalyst.

At this step S15, the catalyst temperature (or exhaust gas temperature) Te is inputted. At the next step S16, it is judged whether or not the catalyst temperature Te is lower than a specified preset temperature (predetermined temperature) Te0. At this step S16, when the catalyst temperature Te is higher than the specified preset temperature Te0, the NOx discharge occurs if the engine operation is shifted to the rich-condition control. Therefore, the control flow returns to the step S13 to repeat the lean-condition control until the catalyst temperature Te becomes lower than the specified preset temperature Te0. Here, this specified preset temperature Te0 is set to a temperature, for example, the temperature within the range of 400° C.–500° C. in the case of the direct reduction type NOx catalyst having the characteristic shown in FIG. 3.

Moreover, at the step S16, if the catalyst temperature Te is lower than the specified preset temperature Te0, the NOx discharge does not occur even if the rich-condition control is performed, therefore, the control goes to the step S17 to be shifted to the rich-condition control flow.

At this step S17, the engine speed Ne and the fuel injection quantity Q are inputted. At the next step S18, a rich preset time trs is calculated from the engine speed Ne and the fuel injection quantity Q referring to the rich preset time map.

And, at the next step S19, the rich-condition control is performed for a predetermined time (a time related to the time intervals of the control). In this rich-condition control, the control of the intake throttle and post injection or the like which are preset correspondingly to the engine speed Ne and the fuel injection quantity Q, are carried out. Through this rich control, the oxygen concentration in the exhaust gas is made to almost zero percent to bring the exhaust gas into the rich state. In such a manner, the active substance is activated to regenerate the catalyst.

At the step S20 after this step S19, it is judged whether or not to end the rich-condition control, depending on whether or not the rich integrated time tr exceeds the rich preset time trs.

When the rich-condition control is not judged as ended by this judgment at the step S20, the rich-condition control at the step S19 is repeated to wait for ending of the rich-condition control. When the rich-condition control is judged as ended by the judgment at the step S20, the control flow returns to the step S11.

The above steps S11–S20 are repeatedly executed, and when an interrupt is caused during this execution by engine key OFF interrupt (step S21), the control flow is stopped after the control ending operation is performed at the step S22. This control ending operation includes, for example, operation of storing the lean integral time tl and the rich integrated time tr. Thus, when the lean-condition control or the rich-condition control is interrupted on the way and it is restarted next time, the values at the time of the interrupt can be used as the initial values of the lean integral time tl and the rich integrating time tr, respectively.

By using the above NOx purifying system and the catalyst regeneration control therefor, the rich-condition control can be performed avoiding the temperature range of the catalyst where the concentration of NOx at the catalyst outlet is increased in the rich-condition control, therefore, the NOx in the exhaust gas can efficiently be purified while the NOx is being prevented from being discharged into the atmospheric air, and also the fuel cost can be prevented from worsening.

What is claimed is:

1. A method for regenerating a NOx catalyst in a NOx purifying system having a direct reduction type NOx catalyst provided in an exhaust passage and directly decomposing NOx during a lean condition operation and being regenerated during a rich condition operation, comprising prohibiting a rich condition control when the temperature detected by a catalyst temperature detector is greater than a set temperature which is within a predetermined temperature range of between 400° C. and 500° C.

2. A NOx purifying system direct reduction type NOx catalyst provided in an exhaust passage and directly decomposing NOx during a lean condition operation and being regenerated during a rich condition operation, which comprises a catalyst temperature detector, and a control device to prohibit a rich condition control when the temperature detected by the catalyst temperature detector is greater than a set temperature which is within a predetermined temperature range of between 400° C. and 500° C.

3. A method for regenerating a direct reduction type NOx catalyst provided in an exhaust passage, comprising:
   detecting the direct reduction type NOx catalyst temperature; and
   regenerating the NOx while performing a rich condition operation only when the detected temperature is less than a set temperature which is between 400° C. and 500° C.

4. A NOx purifying system having a direct reduction type NOx catalyst provided in an exhaust passage, comprising:
   a catalyst temperature detector detecting a temperature of the direct reduction type NOx catalyst; and
   a control device causing a rich condition control to be performed only when the temperature detected by the catalyst temperature detector is less than a set temperature which is between 400° C. and 500° C.

* * * * *